United States Patent [19]

Matsumoto et al.

[11] Patent Number: 5,821,666
[45] Date of Patent: Oct. 13, 1998

[54] UNITED CONTROL SYSTEM COMPRISING A PLURALITY OF CONTROL UNITS INDEPENDENTLY CONTROLLABLE

[75] Inventors: Naoki Matsumoto; Manabu Otsuka, both of Aichi-ken; Koji Ogusu, Oobu; Takahisa Kaneko; Takaharu Idogaki, both of Okazaki, all of Japan

[73] Assignee: Nippondenso Co., Ltd., Kariya, Japan

[21] Appl. No.: 717,020

[22] Filed: Sep. 20, 1996

[30] Foreign Application Priority Data

Sep. 22, 1995 [JP] Japan ................................. 7-244795
Sep. 27, 1995 [JP] Japan ................................. 7-249832

[51] Int. Cl.$^6$ ........................................... H02N 2/00
[52] U.S. Cl. ............................................ 310/316; 310/328
[58] Field of Search ..................... 310/316, 323, 310/328, 317, 338

[56] References Cited

U.S. PATENT DOCUMENTS

| | | | |
|---|---|---|---|
| 3,947,708 | 3/1976 | Fulenwider | 310/317 |
| 4,849,668 | 7/1989 | Crawley et al. | 310/328 |
| 4,928,030 | 5/1990 | Culp | 310/328 |
| 4,953,413 | 9/1990 | Iwata et al. | 310/317 |
| 5,043,621 | 8/1991 | Culp | 310/316 |
| 5,237,236 | 8/1993 | Culp | 310/317 |
| 5,257,669 | 11/1993 | Kerley et al. | 180/7.1 |
| 5,268,621 | 12/1993 | Hamers et al. | 318/116 |
| 5,281,899 | 1/1994 | Culp | 310/316 |
| 5,337,732 | 8/1994 | Grundfest et al. | 128/4 |
| 5,525,853 | 6/1996 | Nye et al. | 310/316 |
| 5,585,956 | 12/1996 | Lee et al. | 310/328 |

FOREIGN PATENT DOCUMENTS

| | | | |
|---|---|---|---|
| 63-179584 | 7/1988 | Japan | H01L 41/08 |
| 64-005616 | 1/1989 | Japan | B21B 37/00 |
| 4-222472 | 8/1992 | Japan | H02N 2/00 |
| 4-300008 | 10/1992 | Japan | B21B 37/00 |
| 5-228860 | 9/1993 | Japan | B25S 9/10 |
| 7-110711 | 4/1995 | Japan | G05D 1/02 |
| 705569 | 12/1979 | U.S.S.R. | 310/316 |

OTHER PUBLICATIONS

Mizukami, et al: "Cooperation Control of Uniformly Distributed Actuators using Gradient of State Function", 9th Annual Conference Of The Robotics Society Of Japan, pp. 29–30, No. 27–29, 1991.

Hirose et al: "Study of Articulated Body Mobile Robot Koryu", 9th Annual Conference Of The Robotics Society Of Japan, pp. 311–312, Nov. 27–29, 1991.

Murakami et al: A Control of Multi–degree–of–Freedom System by Millimachine Technology I, Precision Engineering Institute Report, vol. 60, No. 3, 1994, pp. 352–357.

Primary Examiner—Thomas M. Dougherty
Attorney, Agent, or Firm—Cushman Darby & Cushman IP Group of Pillsbury Madison & Sutro LLP

[57] ABSTRACT

Control units $U_{i-1}$, $U_i$ and $U_{i+1}$, each having a piezoelectric actuator 3, are aligned on a resilient substrate 1 at predetermined intervals, so as to constitute a united control system. An actuator controller, formed on a circuit substrate 4 of control unit $U_i$, receives target displacements of neighboring other control units $U_{i-1}$ and $U_{i+1}$. Then, using a discrete difference equation derived from the partial differential equation describing the distributed parameter system model of the united control system, the displacement amount of control unit $U_i$ can be determined based on the target displacement of the control unit $U_i$ and the target displacements of the neighboring other control units $U_{i-1}$ and $U_{i+1}$ thereby driving piezoelectric actuator 3 smoothly.

7 Claims, 14 Drawing Sheets

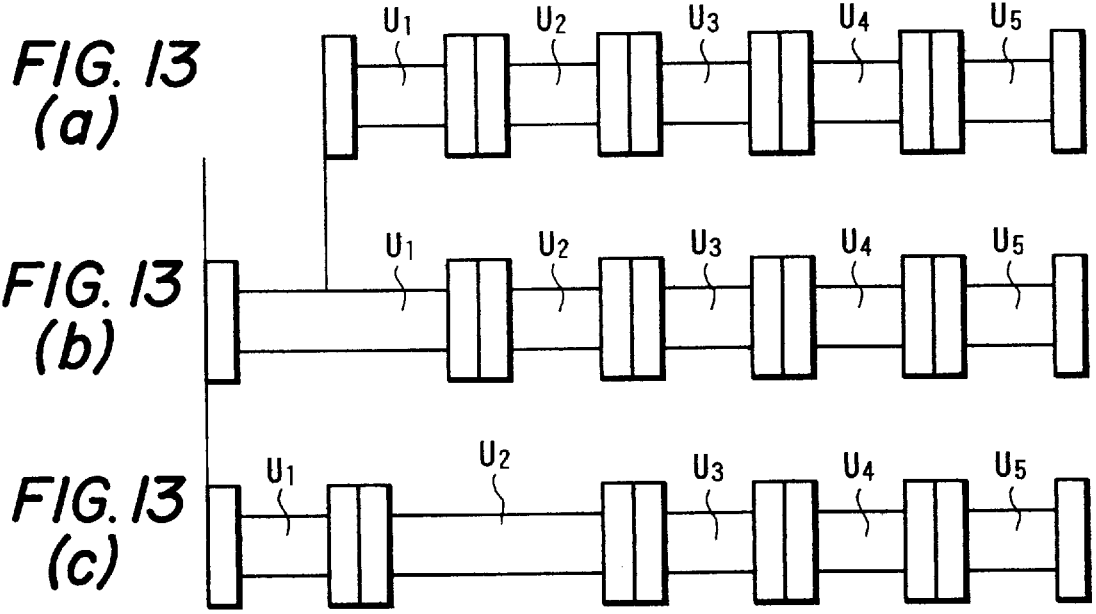
FIG. 13(a)
FIG. 13(b)
FIG. 13(c)
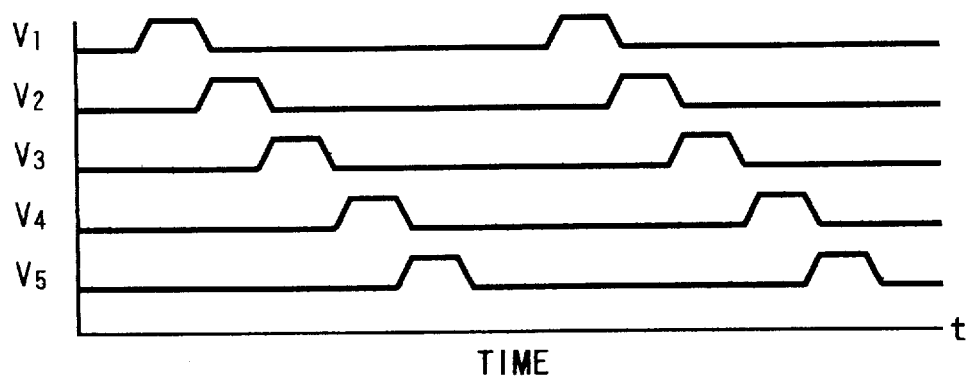
FIG. 14

FIG. 23(b) CHARGE DISTRIBUTION ON ROAD SURFACE ELECTRODE

UNITED CONTROL SYSTEM COMPRISING A PLURALITY OF CONTROL UNITS INDEPENDENTLY CONTROLLABLE

BACKGROUND OF THE INVENTION

1. Field of the Invention

This invention relates to a plurality of control units disposed adjacently in a given space to cause a significant displacement for cooperatively forming a united control system used for controlling a variable structure planar actuator, a variable-structure wing or the like.

2. Description of Related Art

There is the need to realize a desirable change or modification in the configuration or motion characteristics of an object by using a plurality of actuators which are disposed adjacently in a given space and mechanically and electrically connected each other. In handing such a united control system, the lumped-parameter system model has been conventionally used to define the relationship for the connection between respective actuators. For example, these actuators can be characterized by the simplified mechanical components, such as springs and dampers or the like, in making such a lumped-parameter system model.

One of problems employing the lumped-parameter system model in practice is the huge computation volume which is greatly increased with the increasing number of the actuators installed.

To solve this problem, Mizukami et al. have already proposed a technique of "Cooperation Control of Uniformly Distributed Actuators using Gradient of State Function" in the 9th Annual Conference of the Robotics Society of Japan, pp. 29–30, Nov. 27–29, 1991. According to this technique, numerous actuators each capable of expanding and contracting in the vertical direction are arranged in a two-dimensional matrix pattern. The actuating force of each actuator is calculated from a difference equation of external forces applied to the neighboring actuators. Using this control method, each CPU separately disposed on each actuator executes a relatively simple calculation, so that a ball staying on the actuators can be shifted in the horizontal direction.

However, the above-proposed conventional control method is incomplete in that the study is conducted only on the transportation of an ideal ball. Hence, it is not clear what kind of behavior is achieved according to the above-described difference equation when this method is applied to practical systems.

SUMMARY OF THE INVENTION

Accordingly, in view of above-described problems encountered in the related art, a principal object of the present invention is to provide a control unit which is separately controlled through a relatively simple calculation and is capable of realizing a united control system accurately predicting the behavior.

In order to accomplish this and other related objects, a first aspect of the present invention provides a control unit serving as one of a plurality of control units disposed adjacently in a given space so as to constitute a united control system. According to the control unit of the first aspect invention, target displacement receiving means receives target displacement ($u_{i-1}$, $u_{i+1}$) of neighboring other control units ($U_{i-1}$, $U_{i+1}$, ). Then, a displacement amount determining means determines a displacement amount of the control unit ($U_i$) using a. discrete difference equation based on a target displacement ($u_i$) of the own control unit ($U_i$) and the target displacements ($u_{i-1}$, $u_{i+1}$) of the neighboring other control units ($U_{i-1}$, $U_{i+1}$). The discrete difference equation is derived from a partial differential equation expressing a distributed parameter system model realized when the control unit ($U_i$) is disposed together with other control units in the given space. And then, actuating means causes the control unit ($U_i$) to move in accordance with the displacement amount determined by the displacement amount determining means.

According to the arrangement of the first aspect invention, the displacement amount of the own control unit can be obtained through a relatively simple calculation using only the target displacement of the control unit ($U_i$) and the target displacements of the neighboring other control units ($U_{i-ii}U_{i+ii}$). Hence, the overall computation amount can be greatly reduced.

Furthermore, based on the determined displacement amount, each control unit is shifted to its target position. Hence, the behavior of a united control system comprising these control units which are continuously connected in a given space can be correctly predicted.

According to preferred embodiments of the present invention, the actuating means is a plate-like piezoelectric actuator. Alternatively, the actuating means is a piezoelectric actuator which is part of a multi-plate piezoelectric actuator.

A second aspect of the present invention provides a united control system comprising a plurality of control units of the first aspect invention which are disposed on a substrate at predetermined intervals, thereby constituting a variable structure planar actuator.

A second aspect of the present invention provides a control unit serving as one of a plurality of control units disposed adjacently in a given space so as to constitute a united control system. According to the control unit of the second aspect invention, a target displacement receiving means receives target displacement ($u_{i-1,j}$, $u_{i+1,j}$) of neighboring other control units ($U_{i-1}$, $U_{i+1}$). Then, a target displacement determining means determines a next target displacement ($u_{i,j+1}$) of the control unit ($U_i$) using a discrete difference equation based on a present target displacement ($u_{i,j}$) of the own control unit ($U_i$) and the target displacement ($u_{i-1,j}$, $U_{i+1,j}$) of the neighboring other control units ($U_{i-1}$, $U_{i+1}$). The discrete difference equation is derived from a partial differential equation expressing a distributed parameter system model realized when the control unit ($U_i$) is disposed together with other control units in the given space. Then, an actuating means causes the own control unit ($U_i$) to move in accordance to the present target displacement ($U_{i,j}$). A target displacement transmitting means transmits the target displacement ($U_{i,j}$) of the own control unit ($U_i$) to the neighboring other control units ($U_{i-1}$, $U_{i+1}$).

According to the arrangement of the second aspect invention, the next target displacement of the own control unit can be determined through a relatively simple calculation using the discrete difference equation derived from the partial differential equation describing the distributed parameter system model of the virtual object. Thus, the own control unit is smoothly shifted to the target position. Therefore, the control system as a whole can be formed according to the partial differential equation, while reducing the computation volume in the calculation circuit. "Next target displacement" defined by the present invention is not limited to time, but also includes the spatial displacement.

According to the preferred embodiment of the present invention, the control unit further comprises an external force detecting means for detecting an external force acting on the control unit ($U_i$). The target displacement determining means adds a variable to the difference equation in accordance with the external force detected by the external force detecting means and determines the next target displacement ($U_{i,j+1}$) of the control unit ($U_i$) using the difference equation thus modified. Moreover, the external force detecting means detects the external force based on a reaction force against a driving force of the actuating means. Hence, no special sensor is required for detecting the external force.

The displacement or displacement amount defined by the present invention is a concept including various physical quantities, such as temperature, electric potential, magnetic potential, which are transformable into the displacement on a given coordinate system.

Besides the thermal diffusion model, other various models can be used as the distributed parameter system model of the present invention.

BRIEF DESCRIPTION OF THE DRAWINGS

The above and other objects, features and advantages of the present invention will become more apparent from the following detailed description which is to be read in conjunction with the accompanying drawings, in which:

FIGS. 13 (a–c) are side views illustrating the advancement of the united control system in accordance with the second embodiment of the present invention;

FIG. 14 is a time chart showing the timing of electric power supply to respective control units in accordance with the second embodiment of the present invention;

FIG. 20($b$) is a view illustrating the displacement of the united control system in accordance with the second embodiment of the present invention;

FIG. 23($b$) is a view showing the charge distribution in accordance with the third embodiment of the present invention.

DETAILED DESCRIPTION OF THE PREFERRED EMBODIMENTS

Figure 1:
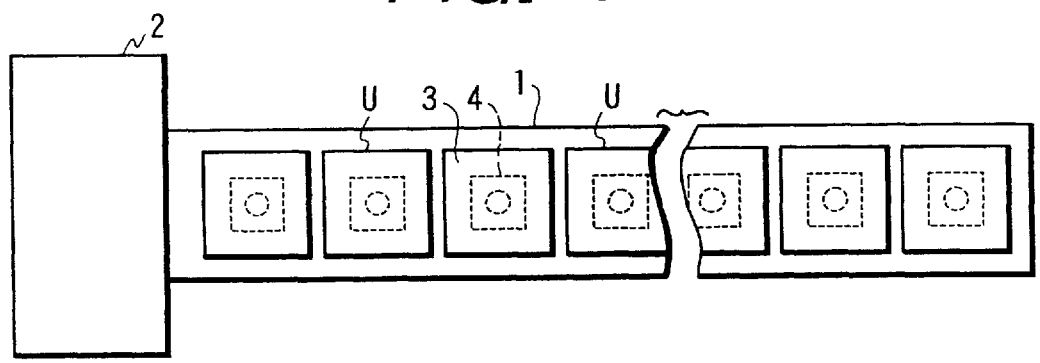
FIG. 1 is a plan view showing a united control system arranging a plurality of control units on a cantilever-like substrate in accordance with a first embodiment of the present invention.

Preferred embodiments of the present invention will be explained in greater detail hereinafter with reference to the accompanying drawings. Identical parts are denoted by the same reference numerals throughout the views.

Figure 2:
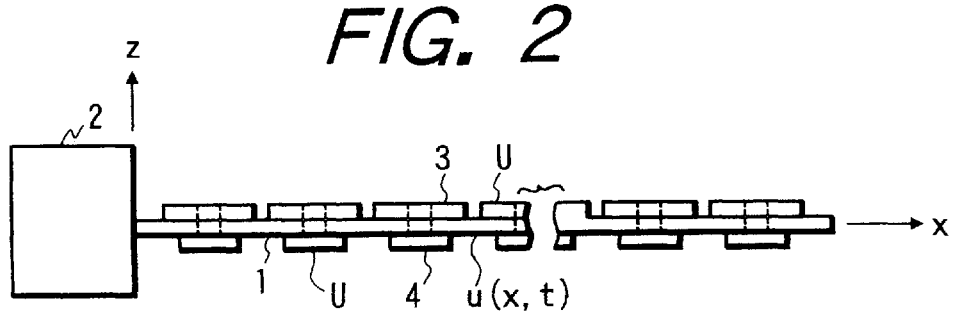
FIG. 2 is a side view showing the united control system arranging the plurality of control units on the cantilever-like substrate in accordance with the first embodiment of the present invention.

FIGS. 1 and 2 cooperatively show the appearance of a united control system employing the control units of the present invention. FIG. 1 is a plan view, and FIG. 2 is a side view. In the figures, an elongated substrate 1 has a base end securely fixed to a support stand 2 and a distal end extending in the horizontal direction. In other words, elongated substrate 1 is a flat cantilever supported at its base end by support stand 2. A plurality of plate-like, square PZT piezoelectric actuators 3 are aligned on the upper surface of this substrate 1 at predetermined intervals along the longitudinal direction of the substrate 1.

Circuit substrates 4, each comprising an actuator controller described below, are provided on the lower surface of the substrate 1 so that the respective circuit substrates 4 are disposed in confronting relation with their corresponding or associated PZT actuators 3 provided on the upper surface of the substrate 1. A pair of PZT actuator 3 and circuit substrate 4 cooperatively constitute a control unit U.

As shown in FIG. 2, the coordinate system applied on this control system has an origin located at the base end of substrate 1 and an X axis extending toward the distal end of substrate 1. When the piezoelectric actuator 3 is operated, substrate 1 causes a displacement in an up-and-down direction. This displacement u is generally expressed by a function u (x,t) which is defined by parameters of position x and time t.

Figure 3:
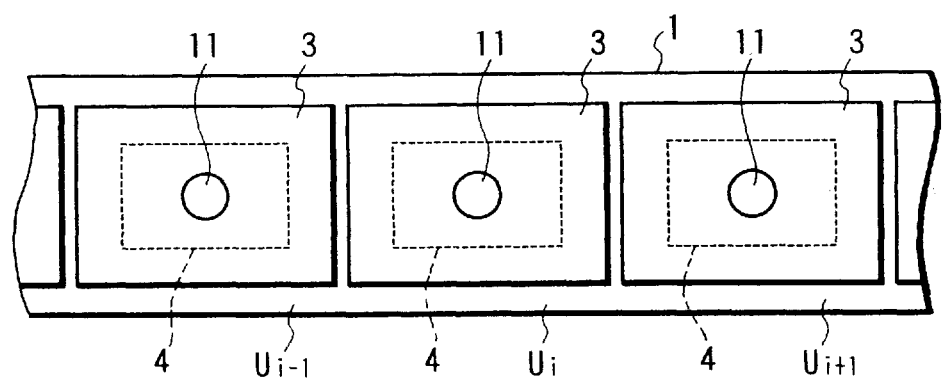
FIG. 3 is a partially enlarged plan view showing the control system arranging the plurality of control units on the cantilever-like substrate in accordance with the first embodiment of the present invention.
Figure 4:
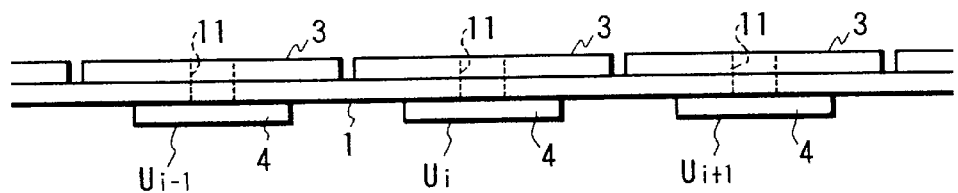
FIG. 4 is a partially enlarged side view showing the united control system arranging the plurality of control units on the cantilever-like substrate in accordance with the first embodiment of the present invention.

FIG. 3 is a partially enlarged plan view of substrate 1, while FIG. 4 is a partially enlarged side view of substrate 1. Each piezoelectric actuator 3 is bonded by a flash adhesive on the substrate 1 made of spring member (beryllium copper). A circular through-hole 11 is opened at the center of each piezoelectric actuator 3. This through-hole 11 extends perpendicularly to the surface of the substrate 1 and reaches the circuit substrate 4 provided on the opposite surface of the substrate 1. Actuating electrodes (not shown) are extracted from the upper and lower surfaces of piezoelectric actuator 3.

Figure 5:
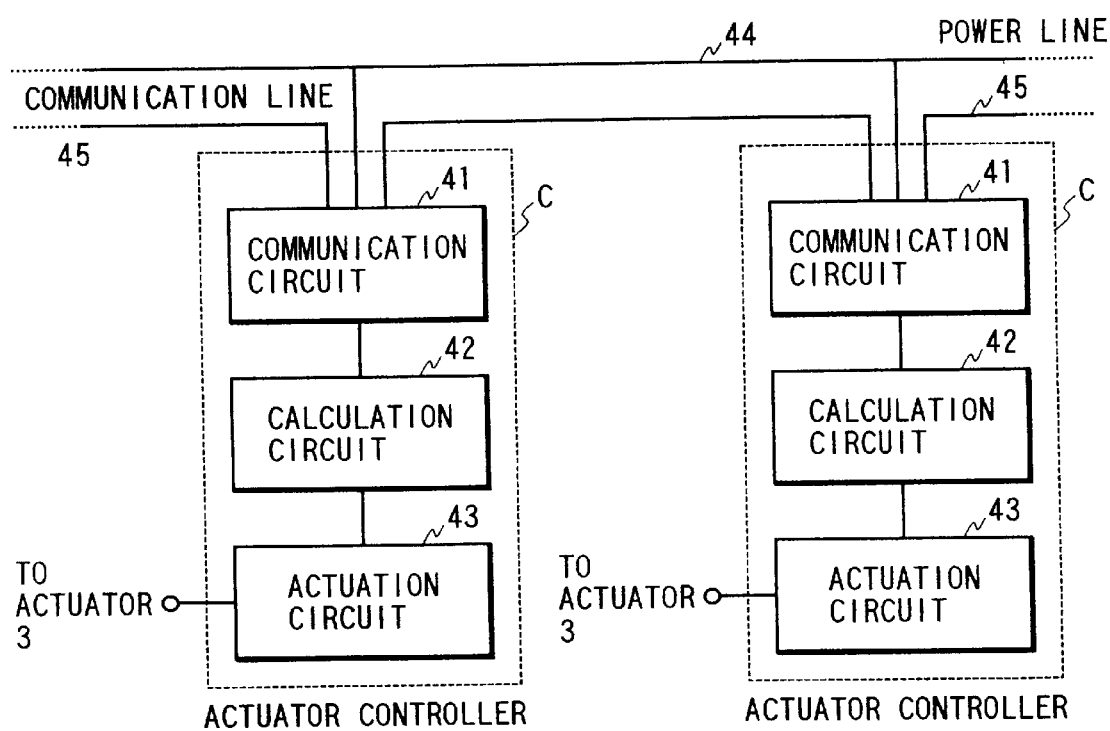
FIG. 5 is a schematic block diagram showing the arrangement of each actuator controller in accordance with the first embodiment of the present invention.

FIG. 5 shows the arrangement of an actuator controller C on circuit substrate 4. Each actuator controller C comprises a communication circuit 41, a calculation circuit 42 including CPU, and an actuation circuit 43 connected to piezoelectric actuator 3. A power line 44 is connected in parallel to respective actuator controllers C. Communication circuit 41 of each actuator controller C is connected via communication line 45 to the communication circuit 41 of any neighboring actuator controller C.

Substrate 1, on which a plurality of control units U are disposed as described above, can be expressed by the partial differential equation of the following equation (1) as elastic deformation model in the distributed parameter system model.

$$\partial^2 u\ (x,\ t)\partial^2 x^2 = M\ (x,\ t)\ /E\ I \tag{1}$$

where E and I represent the modulus of direct elasticity and the geometrical moment of inertia, respectively, in the elastic deformation model.

Deformation moment M(x,t) is generated between each piezoelectric actuator 3 and substrate 3 when each piezoelectric actuator 3 is operated. The relationship between the deformation moment M (x,t) and the actuation voltage V (x,t) applied to piezoelectric actuator 3 is defined by the following equation (2) using the conversion factor G.

$$M\ (x,\ t) = G \cdot V(x,\ t) \tag{2}$$

Accordingly, the following equation (3) is derived from the equations (1) and (2).

$$\partial^2 u(x,\ t)\ /\partial x^2 = G \cdot V(x,\ t)\ /E\ I \tag{3}$$

In practice, piezoelectric actuators 3 are disposed in a discrete manner at predetermined intervals. When $\delta x$ represents the gap between adjacent piezoelectric actuators 3, the equation (3) is modified into the following difference equation (4).

$$u(X_{i+1},\ t) - 2u(X_{i,\ t}) + u(X_{i-1,\ t}) = k \cdot V(X_i,\ t) \tag{4}$$

where $k = G \cdot \delta x^2/EI$, $u(X_{i,\ t})$ represents the displacement at the substrate portion (defined by coordinate $x_i$) where the piezoelectric actuator $3_i$ is disposed, i.e. the displacement (target displacement) of control unit $U_i$ at the time t, and $V(x_i, t)$ represents an actuation voltage applied to the piezoelectric actuator of the control unit $U_i$ at the time t.

Figure 6:
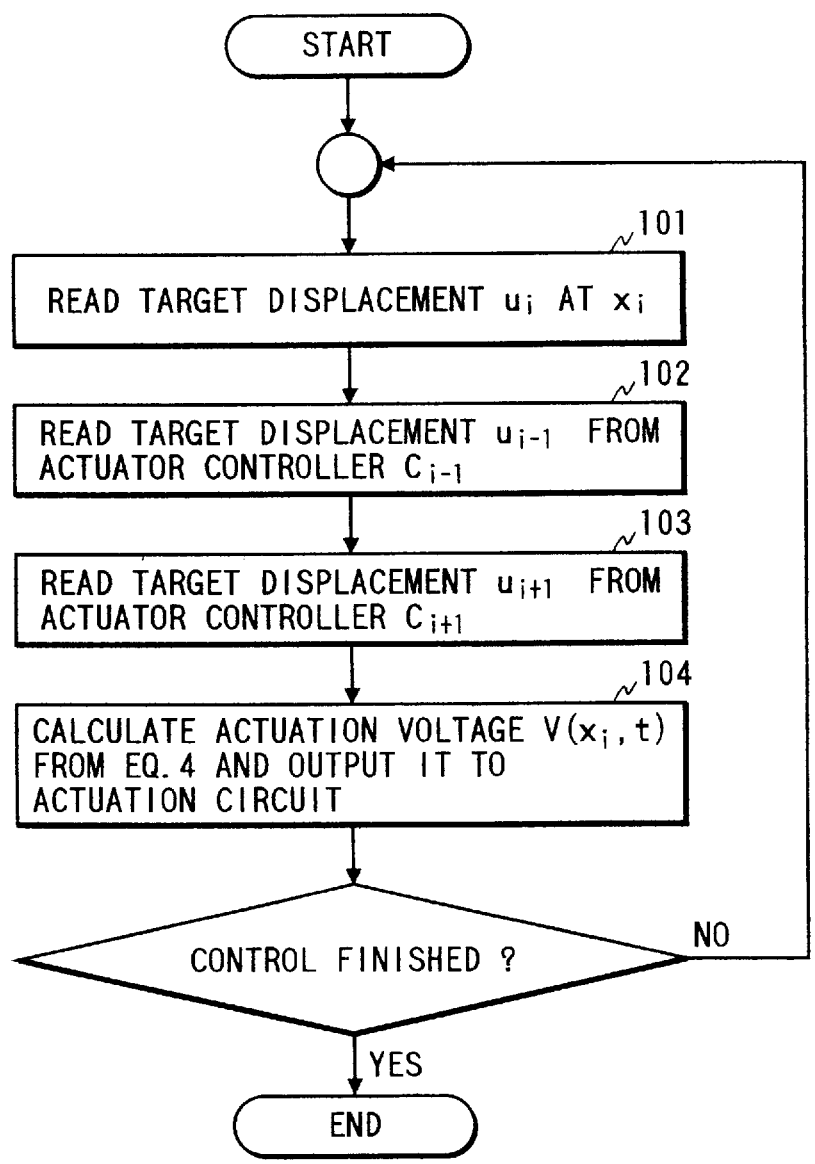
FIG. 6 is a flow chart showing the control procedure performed in the calculation circuit of each actuator controller in accordance with the first embodiment of the present invention.

FIG. 6 shows the control procedure in the calculation circuit 42 of actuator controller Ci of control unit $U_{i-1}$. In step 101 of this flow chart, target displacement u at substrate portion $x_i$ is read in. This target displacement $u_i$ is memorized beforehand in the memory of the actuator controller Ci to cause each substrate portion $x_i$ to deform into an intended configuration. Alternatively, this target displacement $u_i$ can be given as time series data from the external device via an appropriate communication line (not shown) to allow the substrate to cause a continuous deformation.

In the next step 102, target displacement $u_{i-1}$ of control unit $U_{i-1}$ is read in through communication line 45 and communication circuit 41 from one neighboring actuator controller $C_{i-1}$. Similarly, in step 103, target displacement $u_{i+1}$ of control unit $U_{i+1}$ is read in from the other neighboring actuator controller $C_{i+1}$.

Then, in step 104, actuation voltage $V(x_{i,\ t})$ supplied to piezoelectric actuator 3 of own control unit $U_i$ is calculated using the equation (4) based on the target displacements $u_{i-1}$, $u_{i+1}$, obtained from neighboring control units $U_{i-1}$, and $U_{i+1}$, as well as target displacement $u_i$ of own control unit $U_i$. Then, the calculated actuation voltage $V(x_{i,\ t})$ is sent to actuation circuit 43.

In this manner, in the actuator controller C of each control unit U, the actuation voltage of each piezoelectric actuator 3 can be calculated independently from the difference equation (4). Each portion of substrate 1 causes a displacement toward its target position in response to the deformation caused by the actuation of each piezoelectric actuator 3. As a result, the substrate 1 as a united control system realizes a desirable change in configuration.

In this case, the computation amount of CPU is sufficiently small since the calculation in each actuator controller is performed according to the simple difference equation which comprises only the target displacements of the own control unit and its neighboring control units.

Figure 7:
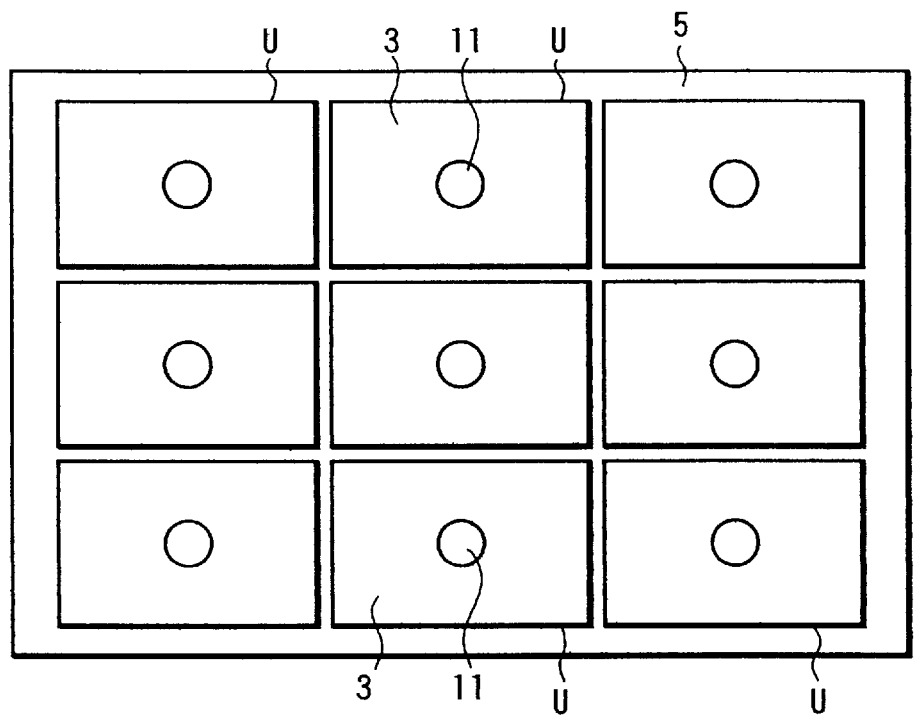
FIG. 7 is a plan view showing a modified control system arranging control units in a matrix pattern on a square substrate in accordance with the first embodiment of the present invention.
Figure 8:
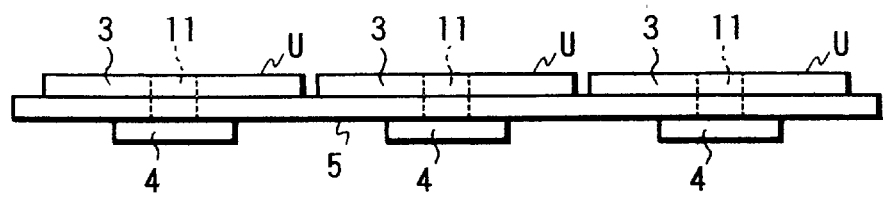
FIG. 8 is a side view of the modified control system shown in FIG. 7.

The united control system realized by this control unit is not limited to a cantilever-like, one-dimensional system. For example, as shown in FIGS. 7 and 8, a plurality of control units U each consisting of piezoelectric actuator 3 and circuit substrate 4 can be arranged on a square substrate 5 in a two-dimensional or matrix pattern. In this case, the calculation of the displacement of the control unit U uses a total of four target displacements of the four neighboring control units disposed at the upper and lower sides and the right and left sides of the control unit U.

Figure 9:
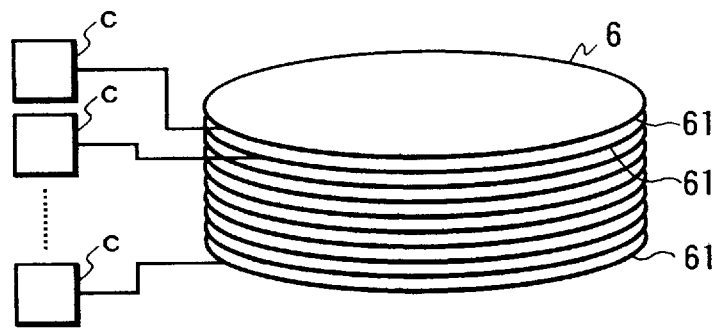
FIG. 9 is a perspective view showing another modified control system consisting of a multi-plate piezoelectric actuator in accordance with the first embodiment of the present invention.

Furthermore, this control unit can be applied to a multi-plate piezoelectric actuator 6 as shown in FIG. 9. The multi-plate piezoelectric actuator 6 comprises numerous disk-shaped PZT piezoelectric actuators 61 successively stacked and bonded on the substrate. This multi-plate piezoelectric actuator 6 can be expressed as an elastic deformation model in the expand/contract direction thereof using the partial differential equation. Then, the actuation voltage supplied to each actuator controller C is determined using the discrete difference equation in the same manner as the above-described embodiment. Each PZT piezoelectric actuator 61 of the multi-plate piezoelectric actuator 6 is operated to cause a desirable deformation in accordance with the result of the simple calculation performed by the associated actuator controller C. Hence, the united control system can cause a large expansion or contraction.

Figure 10:
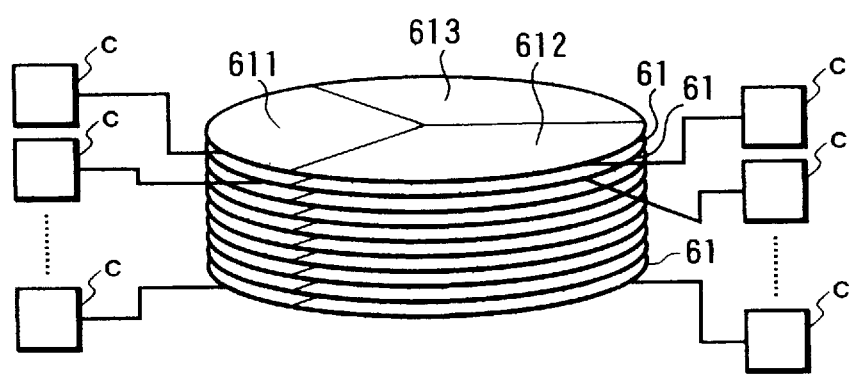
FIG. 10 is a perspective view showing still another modified control system consisting of a multi-plate piezoelectric actuator in accordance with the first embodiment of the present invention.

FIG. 10 shows a modified arrangement of multi-plate piezoelectric actuator 6. According to this arrangement, each PZT piezoelectric actuator 61 forming part of the multi-plate piezoelectric actuator 6 is split into three fragments 611, 612 and 613 evenly on its disk surface. Each of actuator fragments 611, 612 and 613 is independently controlled by an associated actuator controller C.

With this arrangement, the bending moment of the above-described cantilever can be expanded so as to have two degrees of freedom. And also, it becomes possible to realize a large bending deformation in addition to the expansion/contraction motion by adding an elastic deformation model in the expansion/contraction direction and performing the simple calculation using the difference equation in each actuator controller.

The drive section of the control unit is not limited to the piezoelectric actuator generating a mechanical driving force, and is therefore replaceable by other actuating devices such as heaters.

Figure 11:
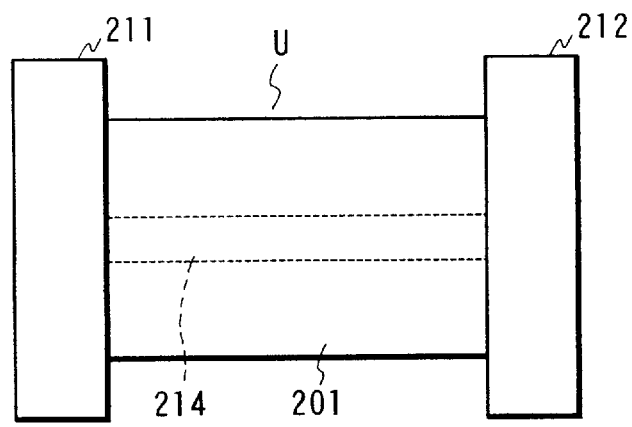
FIG. 11 is a side view showing a control unit in accordance with a second embodiment of the present invention.
Figure 12:
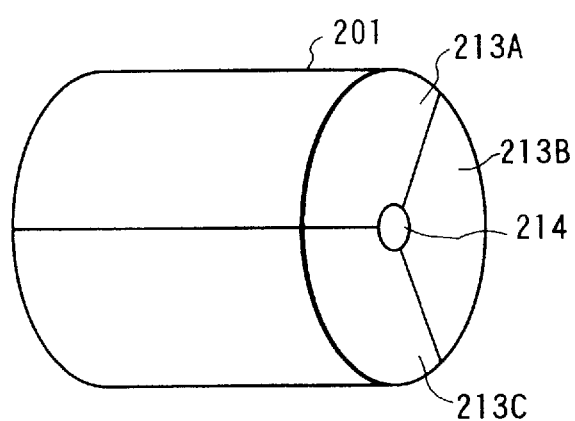
FIG. 12 is a perspective view showing the control unit in accordance with the second embodiment of the present invention.

FIGS. 11 and 12 cooperatively show a control unit U in accordance with a second embodiment of the present invention. Control unit U comprises a multi-plate actuator 201 having a cylindrical body and a pair of disk-like connector cases 211 and 212 fixed to the both ends of the cylindrical multi-plate actuator 201. Multi-plate actuator 201, comprising numerous disk-shaped thin piezoelectric actuators successively stacked, is split evenly into three fragments 213A, 213B and 213C in the angular direction as shown in FIG. 12. Each of these actuator fragments 213A, 213B and 213C is expandable or contractible independently from others. Hence, by applying an actuation voltage appropriately to each of these actuator fragments 213A, 213B and 213C, multi-plate actuator 201 can cause an expanding or contracting deformation.

Each of connector cases 211 and 212 has an outer end surface on which a connector (not shown) is provided, so that each control unit can be mechanically connected to any other control unit having the same construction. With this connecting structure, electric power can be flexibly supplied to or received from any other control unit, and also the communication data can be exchanged between two or more control units.

Connector case 212 accommodates an actuator controller whose arrangement will be described later in detail. A through-hole 214 is provided in the cylindrical body of multi-plate actuator 201 along the axial center thereof. Connector cases 211 and 212, provided at the both ends of multi-plate actuator 201, are electrically connected by wire harness extending in the through-hole 214 for both of the electric power supply and data communication.

FIGS. 13(a)–(c) shows a control system comprising a plurality of sequentially connected control units (U1–U5) each having the arrangement shown in FIGS. 11 and 12. This control system can travel in the longitudinal direction thereof. More specifically, the same actuation voltage is applied to respective actuator fragments 213A, 213B and 213C of the leading control unit U1. In response to this actuation voltage, leading control unit U1 causes an expanding motion while other control units U2–U5 are stationary due to the frictional force acting thereon. As a result, the front end of the leading control unit U1 shifts left as shown by of FIG. 13(b). In other words, the front end (leading head) of the control system moves left.

Next, the supply of electric power to the multi-plate actuator 201 of control unit U1 is stopped and, instead, the same electric power (actuation voltage) is supplied to the multi-plate actuator 201 of the next control unit U2 in a complemental manner. In response to this power control, first control unit U1 causes a contracting motion and returns to the original configuration while second control unit U2 causes an expanding motion. The remaining control units U3–U5 are stationary due to the frictional force acting thereon. During this complex contracting/expanding motion, the entire length of the control system remains constant.

Only the connecting portion between control units U1 and U2 moves left, as shown by FIG. 13(c).

In the same manner, the remaining control units U3–U5 are successively applied the actuation voltage so as to cause the complex expanding/contracting motion between adjacent two control units. The control system hence shifts intermittently to the left of FIGS. 13(a)–(c).

FIG. 14 illustrates the sequence of the application voltages V1–V5 applied to respective control units U1–U5 in this control. Synchronization (timing control) of adjacent two control units in the complex expanding/contracting motion described above can be assured by the communication performed therebetween.

Figure 15:
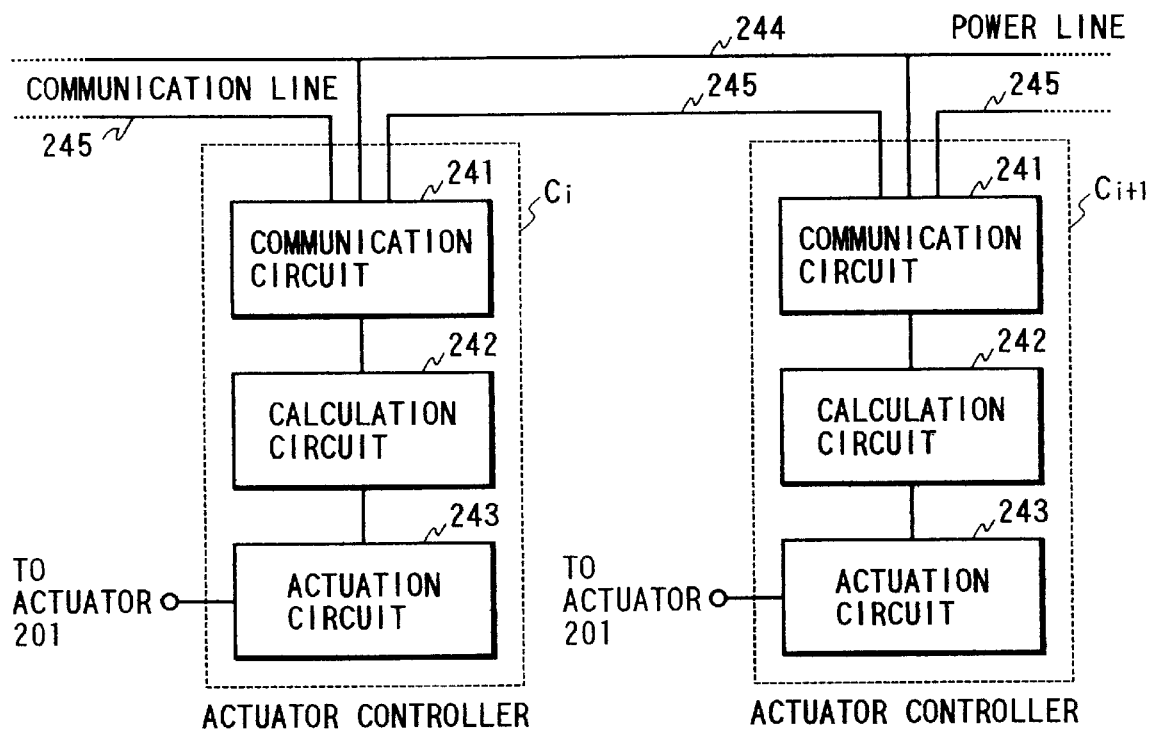
FIG. 15 is a schematic block diagram showing the arrangement of each actuator controller in accordance with the second embodiment of the present invention.

FIG. 15 shows the arrangement of actuator controllers $C_i$ and $C_{i+1}$ provided in the connector cases 212 of respective control units $U_i$ and $U_{i+1}$. Each of actuator controllers $C_i$ and $C_{i+1}$ comprises a communication circuit 241, a calculation circuit 242 including CPU, and an actuation circuit 243 connected to integrated actuator 201. A power line 244 is connected in parallel to respective actuator controllers $C_i$ and $C_{i+1}$. Communication circuit 241 of actuator controller $C_i$ is connected via communication line 245 to the communication circuit 241 of the next actuator controller $C_{i+1}$.

CPU of calculation circuit 242 controls the complex expanding/contracting deformation of each control unit U to realize the above-described self-advancing movement at a predetermined speed, and also detects an external force and then controls the bending deformation of each control unit U in accordance with the detected external force.

Figure 16:
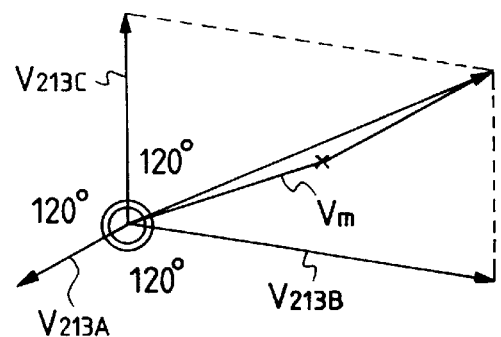
FIG. 16 is a vector diagram showing the voltage applied to a multi-plate actuator in accordance with the second embodiment of the present invention.
Figure 17:
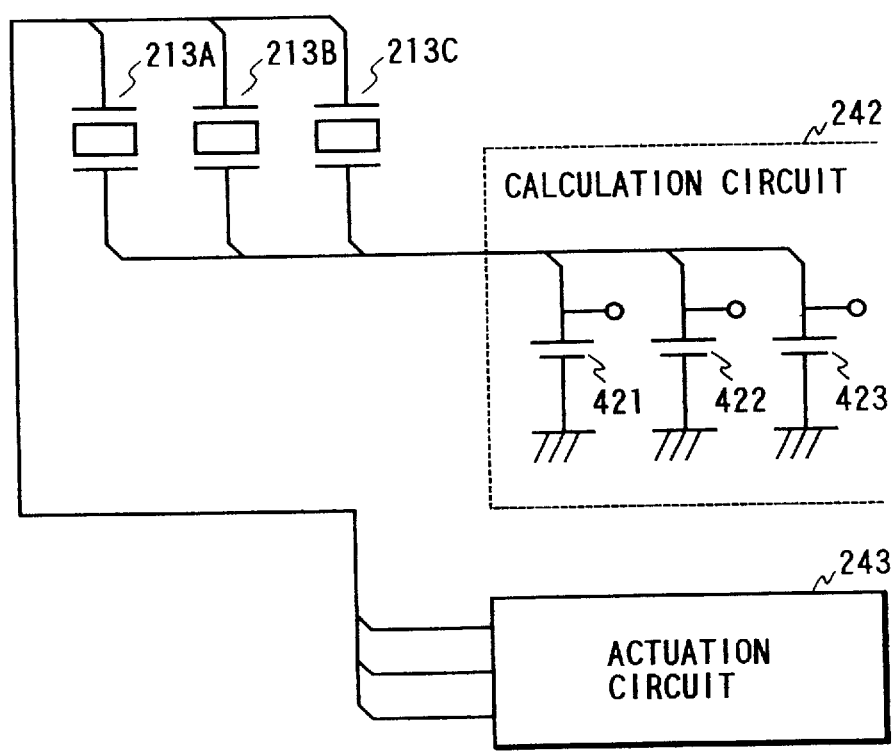
FIG. 17 is a diagram showing a circuit for detecting the charge of the multi-plate actuator in accordance with the second embodiment of the present invention.

First, the arrangement for detecting the external force will be explained. The voltages $V_{213A}$, $V_{213}B$ and $V_{213C}$ applied to respective fragments 213A–213C of multi-plate actuator 201 are mutually differentiated in their phase angles by 120 degrees. FIG. 16 is a vector diagram showing the relationship between these voltages $V_{213}A$, $V_{213}B$ and $V_{213C}$ and their composite voltage Vm.

$$Vm = V_{213A} + V_{213B} + V_{213C} \tag{5}$$

Similarly, considering the mutual phase difference of 120°, electric charges $Q_{213A}$, $Q_{213B}$ and $Q_{213C}$ appearing on respective fragments 213A through 213C can be expressed together with their composite charge Qm on the vector diagram similar to FIG. 16 based on the relationship defined by the following equation.

$$Qm = Q_{213A} + Q_{213B} + Q_{213C} \tag{6}$$

In this case, an external force F causing the multi-plate actuator 201 to bend can be roughly expressed by the following equation in relation to the voltage Vm and charge Qm:

$$F = K \cdot Vm + L \cdot Qm \tag{7}$$

where K and L are predetermined constants.

The voltage Vm is already known in the calculation circuit 242; hence, external force F can be obtained by detecting charge Qm. As shown in FIG. 7, three capacitors 421, 422 and 423 are connected in series to respective actuator fragments 213A, 213B and 213C in calculation circuit 242. Terminal voltages $E_{421}$, $E_{422}$ and $E_{423}$ of these capacitors 421 through 423 are entered into CPU.

It is assumed in this arrangement that $C_{421}$, $C_{422}$ and $C_{423}$ represent the capacitors of respective capacitors 421, 422 and 423. The electric charges $Q_{13A}$, $Q_{13B}$ and $Q_{13C}$ appearing on respective actuator fragments 213A–213C can be calculated using the following equations (8) through (10), respectively, based on the obtained terminal voltages $E_{421}$, $E_{422}$ and $E_{423}$.

$$Q_{13A}=C_{421} \cdot E_{421} \quad (8)$$

$$Q_{13B}=C_{422} \cdot E_{422} \quad (9)$$

$$Q_{13C}=C_{423} \cdot E_{423} \quad (10)$$

Figure 20:
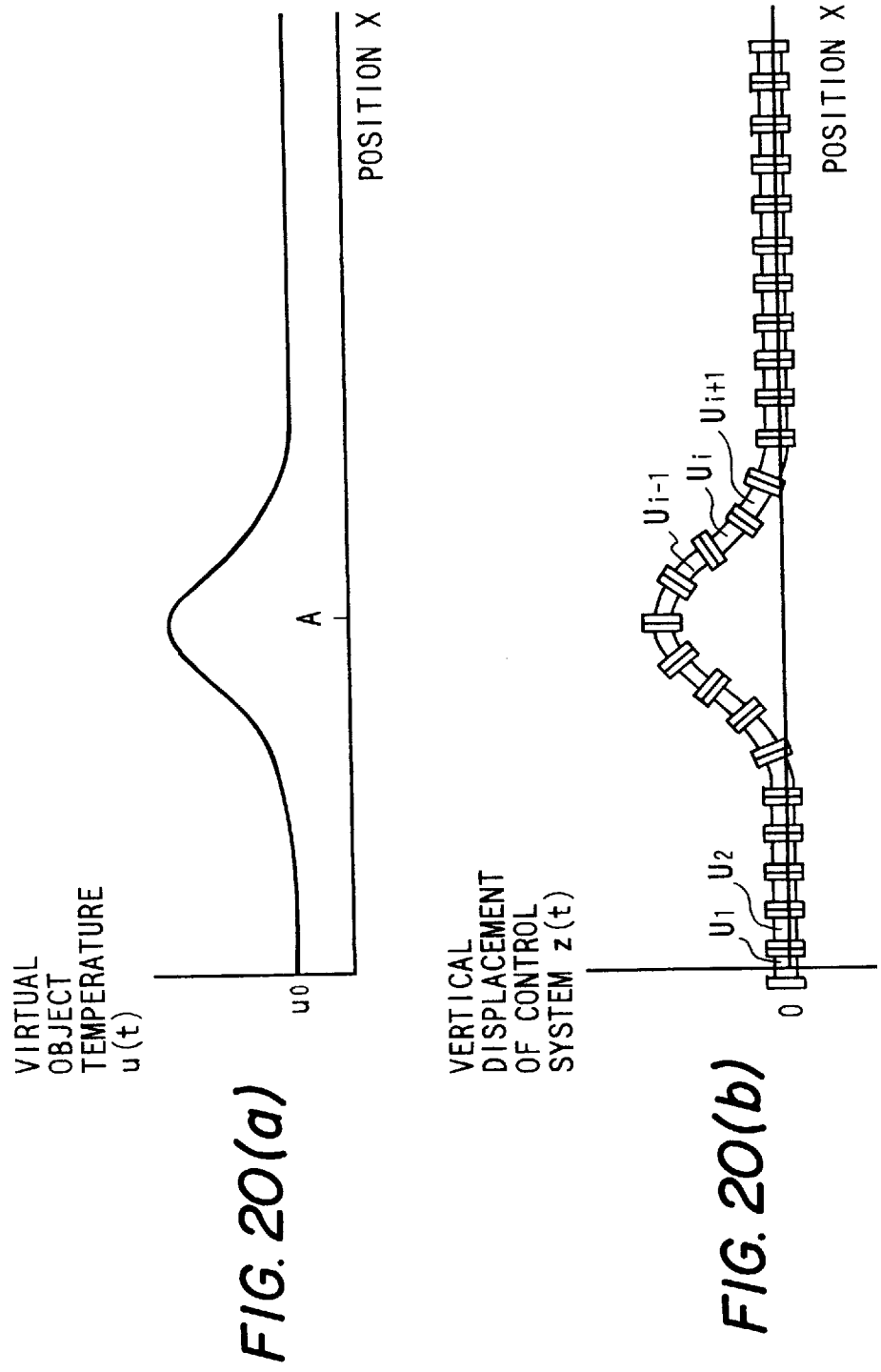
FIG. 20($a$) is a view illustrating the temperature distribution of a virtual object in accordance with the second embodiment of the present invention.

Next, the bending deformation control in each control unit will be explained. As shown by FIG. 20(b), the coordinate system is defined so as to have its origin on the leading head of the control system and its X axis extending in the horizontal direction from the origin. In FIG. 20, a parameter z represents a target displacement of each control unit from the X axis in the vertical direction.

The second embodiment presumes a distributed parameter system model of a virtual object described by a partial differential equation having no relationship with the physical model of the above-described control system. The control system as a whole is controlled to cause a displacement so as to follow the spatial behavior of this model. More specifically, the second embodiment controls the bending deformation of each control unit in accordance with the thermal diffusion equation expressing the relationship between the heat generated from a heat source and the temperature distribution of the virtual object, thereby realizing a desirable change of the entire configuration of the control system.

In general, the thermal diffusion equation is defined by the following equation (11).

$$\partial u(x,t)/\partial t = \kappa^2 \cdot (\partial^2 u(x,t)/\partial x^2) \quad (11)$$

where u(x,t) represents the temperature of the virtual object at the position x and time t, and κ represents the heat transfer coefficient.

According to this embodiment, the relationship between the temperature distribution u(x, t) of the virtual object and the target displacement z(x, t) of each portion of the control system can be expressed by the following linear function:

$$z(x,t)=A \cdot u(x,t)+B \quad (12)$$

where A and B are predetermined constants.

In practice, control units of the control system are disposed in a discrete manner. Calculation of CPU in each control unit is performed at predetermined intervals. Accordingly, the relationship of equation (11) needs to be rewritten into the difference equation with respect to the position x and time t. Hence, a length h is introduced to express the position x and also a time interval p is used to express the time t, thus obtaining the following difference equation.

$$u_{i,j+1}=u_{i,j}+\kappa^2(p/h^2)(u_{i-1,j}-2u_{i,j}+u_{i+1,j}) \quad (13)$$

where $u_{i,j}$ represents the temperature of the virtual object at the position x ($x=x_i=i \cdot h$) and time t ($t=t_j=j \cdot p$).

Using the equations (12) and (13), the target displacement $z_{i,j+1}$ of the control unit Ui can be calculated in accordance with the following equation.

$$z_{i,j+1}=A \cdot u_{i,j+1}+B \quad (14)$$

To realize the vertical displacement of each control unit obtained by the equation (14) it is necessary to obtain a target deformation amount r of each control unit. The relationship between the target displacement z and the target deformation amount r is roughly given by the following equation.

$$r=\partial^2 z(x,t)/\partial x^2 \quad (15)$$

Thus, the following difference equation is derived.

$$r_{i,j}=(z_{i-1,j}-2z_{i,j}+z_{i+1,j})/h^2 \quad (16)$$

Furthermore, by substituting the equation (14) into the equation (16), the following difference equation is obtained.

$$r_{i,j}=A(u_{i-1,j}-2u_{i,j}+u_{i+1,j})/h^2 \quad (17)$$

As apparent from the equation (17), the target deformation amount $r_{i,j}$ of the control unit $U_i$ can be determined by the target displacement $z_{i,j}$ of the control unit (i.e. temperature $u_{i,j}$ of the virtual object), and target displacements $z_{i-1,j}$ and $z_{i+1,j}$ of the neighboring front and rear control units (i.e. temperatures $u_{i-1,j}$ and $u_{i+1,j}$ of the virtual object).

When the control system encounters with an obstacle when the control system is travelling, an external force acting from the obstacle is considered to be a heat source acting on the virtual object. Hence, it is assumed that external force $F_{i,j}$ detected by control unit $U_i$ at time $t_j$ (=j·p) has an ability of increasing the temperature of the virtual object by an amount $\Delta u_{i,j}$. The following equation is defined:

$$\Delta u_{i,j}=D \cdot F_{i,j} \quad (18)$$

where D is a constant for converting the influence of the external force into the temperature increase of the virtual object.

Accordingly, when the control unit receives the external force, the term relating to the temperature increase is added to the equation (13). Hence, the equation (13) is rewritten into the following equation.

$$u_{i,j+1}=u_{i,j}+\kappa^2(p/h^2)(u_{i-1,j}-2u_{i,j}+u_{i+1,j})+D \cdot F_{i,j} \quad (19)$$

Considering this relationship, the target deformation amount $r_{i,j}$ is calculated from the equation (17).

Figure 18:
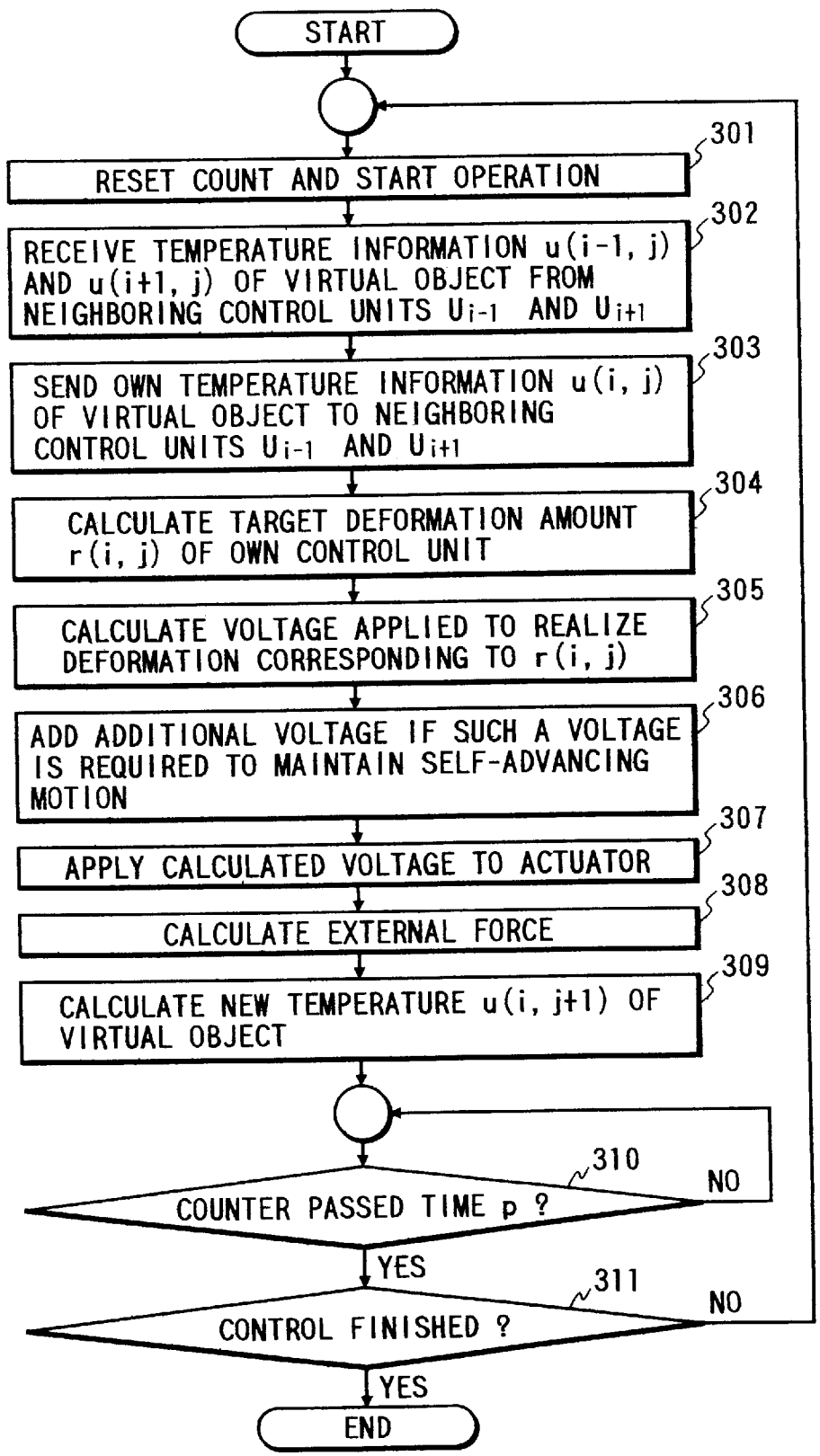
FIG. 18 is a flow chart showing the control procedure performed in the calculation circuit of each actuator controller in accordance with the second embodiment of the present invention.

The control procedure performed in CPU of each control unit will be explained with reference to the flow chart of FIG. 18.

First, in step 301, the counter is reset and then the control of CPU is initiated. In the next step 302, temperature information $u_{i-1,j}$ and $u_{i+1,j}$ of the virtual object are entered from the neighboring front and rear control units $U_{i-1}$ and $U_{i+1}$. Then, in step 303, temperature information $u_{i,j}$ of the own control unit $U_i$ is sent to the neighboring front and rear control units $U_{i-1}$ and $U_{i+1}$. In step 304, the target deformation amount r(i,j) of the own control unit is calculated from the equation (17). Then, in step 305, the voltage to be applied for causing the multi-plate actuator 201 to realize an intended configuration change is calculated based on the target deformation amount r(i,j). In this case, if any additional voltage is required for the expanding/contracting deformation maintaining the self-advancing motion, such an additional voltage is added in step 306.

Next, in step 307, the calculated voltage is applied to the multi-plate actuator 201. Then, in step 308, the external force F is calculated using the equation (7). Subsequently, in step 309, the temperature u(i,j+1) used for the next cycle is calculated using the equation (13) when the control unit is subjected to no external force or using the equation (19) when the control unit is subjected to any external force. The above-described sequential procedure of steps 301–309 is periodically repeated in response to every elapse of time interval p in the counter, as shown in steps 310 and 311.

Figure 19:
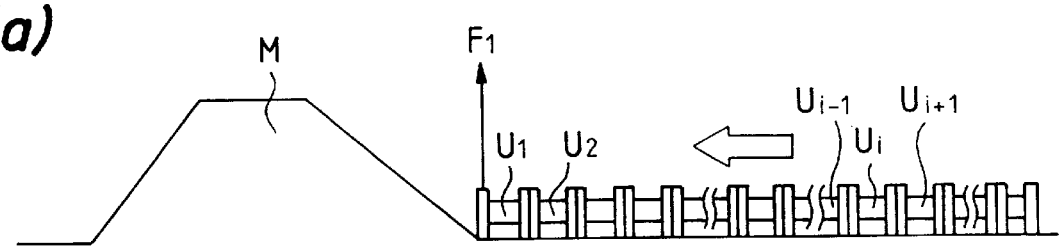
FIGS. 19($a$)–19 ($c$) are views illustrating the deformation process of the united control system in accordance with the second embodiment of the present invention.
Figure 19:
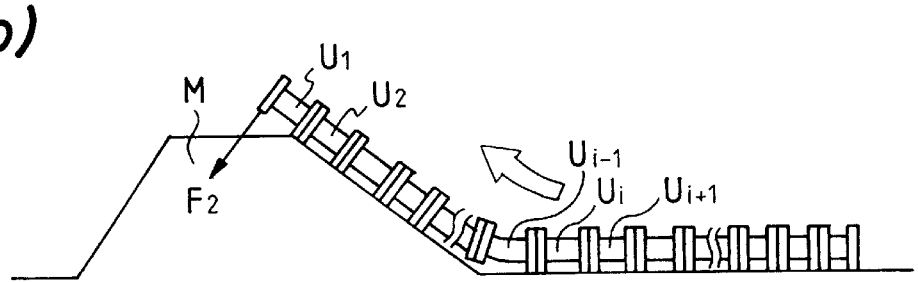
Figure 19:
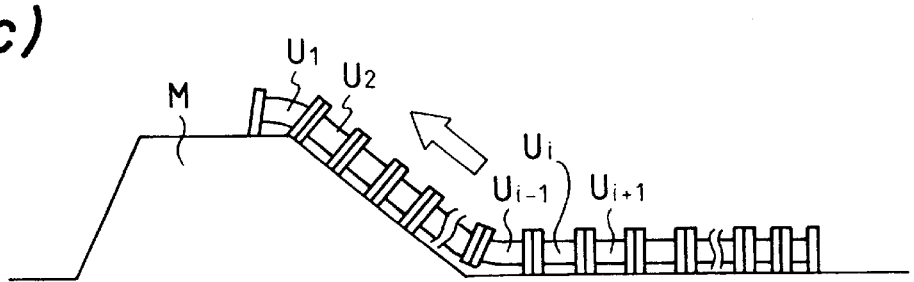

With this control, if the united control system travelling along a white arrow of FIGS. 19(a)–(c) encounters or collides with a projected obstacle M as shown in FIG. 19(a). In this moment, the first (leading) control unit U1 is subjected to an external force F1 acting upward. The target deformation amount $r_{i,j}$ of the leading control unit U1 is calculated using the equations (17) and (19). The target deformation amount of the remaining control units U2, U3 . . . can be calculated using the equations (13) and (17).

Temperature of the virtual object in each of control units U1, U2, . . . , $U_{i-1}$, $U_i$, $U_{i+1}$, . . . , is transmitted to the succeeding control unit by the difference equation (19). As a result, each of the succeeding control units causes a displacement, so that the leading head of the united control system advances along the ascending surface of the obstacle M while preventing the interference between the leading head and the obstacle M as shown by FIG. 19(b).

When the leading head of the united control system reaches the top of the obstacle M, the leading control unit U1 is subjected to an external force F2 acting downward which is equivalent to the dead weight of the control unit U1.

This external force F2 is considered to be a negative heat source. According to the equations (17) and (19), the temperature of the virtual object in the leading control unit U1 is reduced and its target deformation amount $r_{i,j}$ becomes a negative value. The leading control unit U1 bends downward and advances along the top surface of the obstacle M, as shown by FIG. 19(c).

Temperature decrease of the virtual object is successively transmitted to the succeeding control units by the difference equation (13). According to the temperature distribution, shown by FIG. 20(a), the temperature line curves upward at the point A so as to form a protruding shape. In accordance with time elapse, this protruding portion moves from the leading side (the left side of FIGS. 20(a)–(b) to the trailing side. According to the equation (14), the overall configuration of the united control system becomes similar to the above-described temperature distribution, as shown by FIG. 20(b).

Figure 21:
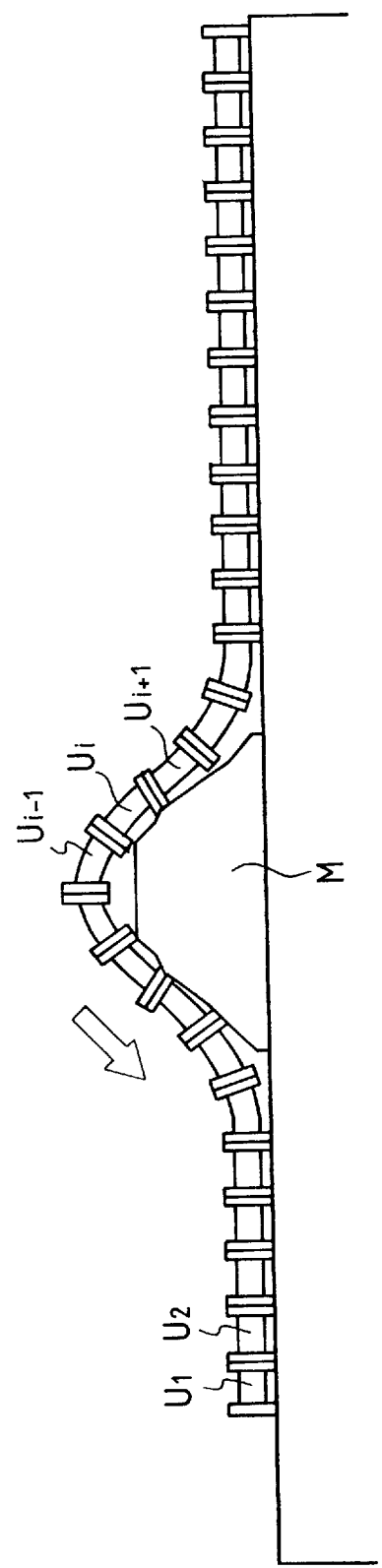
FIG. 21 is a side view showing the deformation of the united control system in accordance with the second embodiment of the present invention.

As a result, the united control system can advance smoothly along the surface of the obstacle M without causing any interference therebetween, as shown in FIG. 21.

In this manner, the second embodiment uses the discrete difference equation of the thermal diffusion equation describing the temperature distribution of the virtual object and makes it possible to cause a desirable deformation of the united control system by performing the simple calculation in each control unit, thereby assuring the sequentially connected control units of the united control system to advance smoothly and avoid the collision with the obstacles.

A third embodiment of the present invention will be explained hereinafter with reference to FIGS. 22 and 23.

Figure 22:
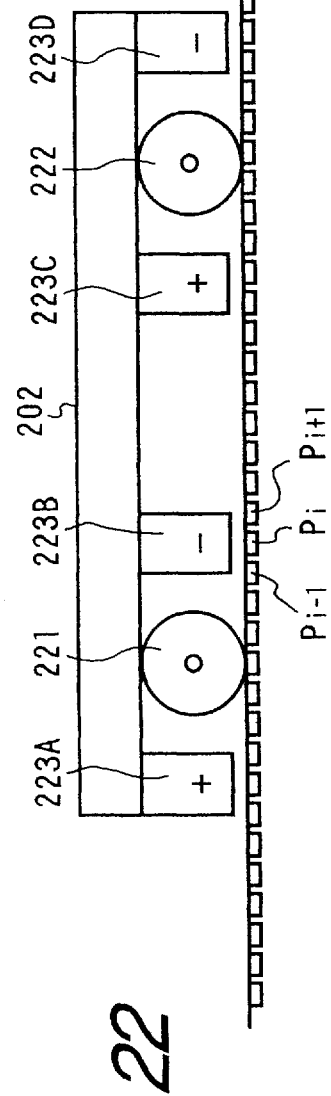
FIG. 22 is a schematic side view showing an entire arrangement of a united control system in accordance with a third embodiment of the present invention.
Figure 23A:
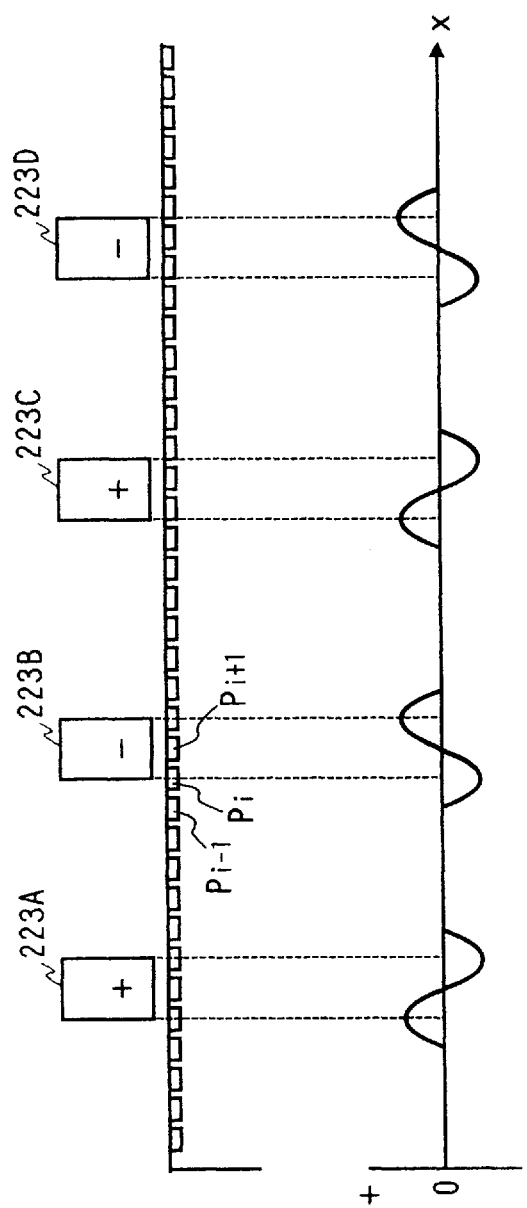
FIG. 23($a$) is a view showing road surface electrodes in accordance with the third embodiment of the present invention.

In FIGS. 22 and 23(a)–23(b), each control unit has an electrode P. Numerous electrodes $P_{i-1}$, $P_i$, $P_{i+1}$, . . . are aligned adjacently and continuously on the surface of a flush road G. Each road surface electrode $P_i$, is connected to the actuator controller $C_i$ disclosed in the second embodiment (FIG. 15). In this case, actuation circuit 243 serves as an electric power supply circuit for generating a predetermined amount of electric charge on the road surface electrode $P_i$.

A vehicle 202 with front and rear wheels 221 and 222 travels on this road G. A total of four electrodes 223A, 223B, 223C and 223D, projecting downward from the lower surface of the vehicle 202, are aligned in the back-and-forth direction of this vehicle 202. Thus, the distal ends of these four electrodes 223A, 223B, 223C and 223D are respectively charged by positive or negative charges as shown in FIG. 23(a).

In other words, positive-negative or negative-positive electric charges shifting from left to right with a predetermined waveform distribution is induced on the road surface electrodes . . . , $P_{i-1}$, $P_i$, $P_{i+1}$, . . . as shown in FIG. 23(b). Hence, the vehicle 202 can move right by the magnetic attraction force or repulsion force acting between the charges.

In this case, the charge generating control in each control unit can be performed based on the following wave equation of the virtual object causing a string oscillation:

$$\partial^2 y(x,t)/\partial t^2 = v^2 \cdot (\partial^2 y(x,t)/\partial x^2) \quad (20)$$

where y(x,t) represents the displacement of the transverse wave of the virtual object at the position x and time t, while v represents the propagation velocity of the wave.

Assuming that H represents the disposition interval between adjacent two road surface electrodes of . . . $P_{i-1}$, $P_i$, $P_{i+1}$, . . . and p represents the time interval determining the operation cycle of CPU the difference equation is derived from the equation (20).

$$y_{i,j+1} = 2y_{i,j} - y_{i,j-1} + v^2(p/H^2)(y_{i-1,j} - 2y_{i,j} + y_{i+1,j}) \quad (21)$$

where $y_{i,j}$ represents the displacement of the transverse wave of the virtual object at time tj (=j·p) in the control unit $U_i$ positioned at the position $x_i$ (=iH).

As apparent from the equation (21), the next target displacement $y_{i,j+1}$ of the own control unit can be obtained through the above-described simple calculation using the data of target displacements $y_{i,j}$ and $y_{i,j-1}$ of the present and previous cycles in the own control unit and the target displacements $y_{i-1,j}$ and $y_{i+1,j}$, of the neighboring front and rear control units.

In the actuator controller Ci, target charge amount $q_{i,j}$ to be given to the road surface electrode is determined by the following equation using target displacement $y_{i,j}$ of its own control unit thus calculated:

$$q_{i,j} = E \cdot y_{i,j} \quad (22)$$

where E is a predetermined constant.

In this manner, according to the third embodiment, each control unit independently performs the simple calculation in accordance with the equation (21), and receives the target displacements of the virtual string from the neighboring control units at their positions. Thus, the charge distribution of the road surface electrode is formed so as to imitate the propagation of the transverse wave, thereby realizing the travelling control of the vehicle.

The control of the present invention can be applied to various systems, such as damping devices for tall buildings and bridges.

As this invention may be embodied in several forms without departing from the spirit of essential characteristics thereof, the present embodiments described are therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. A control unit serving as one of a plurality of control units disposed adjacently in a given space so as to constitute a united control system, said control unit comprising:

target displacement receiving means for receiving target displacements of neighboring other control units;

displacement amount determining means for determining a displacement amount of said control unit using a discrete difference equation based on a target displacement of said control unit and said target displacements of said neighboring other control units, said discrete difference equation being derived from a partial differential equation expressing a distributed parameter system model realized when said control unit is disposed together with other control units of said plurality of units in said given space; and actuating means for causing said control unit to move in accordance with the displacement amount determined by said displacement amount determining means.

2. The control unit in accordance with claim 1, wherein said actuating means is a plate-like piezoelectric actuator.

3. The control unit in accordance with claim 1, wherein said actuating means is a plate-like piezoelectric actuator, said plate-like piezoelectric actuator being a part of a multi-plate piezoelectric actuator.

4. A united control system comprising a plurality of control units disposed on a substrate at predetermined intervals, each control unit comprising:

target displacement receiving means for receiving target displacements of neighboring other control units;

displacement amount determining means for determining a displacement amount of said control unit using a discrete difference equation based on a target displacement of said control unit and said target displacements of said neighboring other control units, said discrete difference equation being derived from a partial differential equation expressing a distributed parameter system model realized when said control unit is disposed together with other control units of said plurality of units in a given space; and actuating means including a piezoelectric actuator, for causing said control unit to move in accordance with the displacement amount determined by said displacement amount determining means.

5. A control unit serving as one of a plurality control units disposed adjacently in a given space so as to constitute a united control system, said control unit comprising:

target displacement receiving means for receiving target displacements of neighboring other control units;

target displacement determining means for determining a next target displacement of said control unit using a discrete difference equation based on a present target displacement of said control unit and said target displacements of said neighboring other control units, said discrete difference equation being derived from a partial differential equation expressing a distributed parameter system model realized when said control unit is disposed together with other control units of said plurality of control units in said given space;

actuating means for causing said control unit to move in accordance to said present target displacement; and target displacement transmitting means for transmitting the target displacement of said control unit to said neighboring other control units.

6. The control unit in accordance with claim 5, further comprising external force detecting means for detecting an external force acting on said control unit, wherein said target displacement determining means adds a variable to said difference equation in accordance with the external force detected by said external force detecting means and determines the next target displacement of said control unit using the difference equation thus modified.

7. The control unit in accordance with claim 6, wherein said external force detecting means detects the external force based on a reaction force against a driving force of said actuating means.

* * * * *